United States Patent [19]

Copeland et al.

[11] Patent Number: 5,240,853

[45] Date of Patent: Aug. 31, 1993

[54] APPARATUS AND METHOD FOR CONTINUOUSLY REMOVING OXYGEN FROM FLUID STREAMS USING BACTERIAL MEMBRANES

[75] Inventors: James C. Copeland, Ashland, Ohio; Howard I. Adler, Oak Ridge, Tenn.

[73] Assignee: Oxyrase, Inc., Ashland, Ohio

[21] Appl. No.: 319,748

[22] Filed: Mar. 7, 1989

[51] Int. Cl.$^5$ .............................................. C12N 11/18
[52] U.S. Cl. ..................................... 435/262; 435/820
[58] Field of Search ............... 435/175, 182, 262, 820, 435/162

[56] References Cited

U.S. PATENT DOCUMENTS

| | | | |
|---|---|---|---|
| 4,195,129 | 3/1980 | Fukui et al. | 435/182 |
| 4,476,224 | 5/1982 | Adler | 435/253 |
| 4,602,987 | 7/1986 | Bonaventura et al. | 204/129 |
| 4,708,796 | 11/1987 | Yoshimoto et al. | 210/321.8 |
| 4,791,061 | 12/1988 | Sumino et al. | 435/178 |

OTHER PUBLICATIONS

Adler H, Biotechnology 10:119–127 (1990).

*Primary Examiner*—Douglas W. Robinson
*Assistant Examiner*—S. Saucier
*Attorney, Agent, or Firm*—Fay, Sharpe, Beall, Fagan, Minnich & McKee

[57] ABSTRACT

The present invention is directed to a continuous flow method for removing oxygen from a fluid stream. The method comprises the steps of providing a fluid stream containing oxygen, causing the fluid stream to come in contact directly or indirectly, with a sufficient amount of oxygen scavenging cell membrane fragments having an electron transport system which reduces oxygen to water to catalyze the transformation of the oxygen contained in the fluid stream to water. The present invention is also directed to an apparatus for removing oxygen from a fluid stream. The apparatus is comprised of a flow through reactor chamber containing a sufficient amount of oxygen scavenging cell membrane fragments having an electron transport system which reduces oxygen to water to catalyze the transformation of oxygen present in a fluid stream to water, wherein said fragments are contained therein in a manner which allows free contact between said fragments and the fluid stream flowing therethrough or for the diffusion of the oxygen from the fluid stream across a synthetic membrane to a compartment containing the fragments where the oxygen is transformed to water. A means for introducing a fluid stream containing oxygen into said flow-through reaction chamber and a means for removing said deoxygenated fluid stream are also provided.

8 Claims, 3 Drawing Sheets

APPARATUS AND METHOD FOR CONTINUOUSLY REMOVING OXYGEN FROM FLUID STREAMS USING BACTERIAL MEMBRANES

BACKGROUND OF THE INVENTION

The present invention relates to an apparatus and method for removing dissolved oxygen from aqueous fluids on a continuous basis.

It is well known that the presence of oxygen in continuous fluid processes, as well as the products produced thereby, can cause a great deal of detrimental damage. For example, beverages and food product's produced by on-line bottling or canning processes, such as fruit juices, soft drinks, beer, wine, milk, soups, vegetable juices, and pastes, etc. may be unstable over even a relatively short period of time due to undesirable changes produced by oxidative deterioration. In this regard, among the oxidative changes which beverages and food products incur over time include changes in color, consistency, and flavor. Since these changes in the beverages and food products greatly decrease the product's marketability, it is desirable to reduce the presence of oxygen in the overall product.

Furthermore, if oxygen is present in the beverage and/or food product during bottling or canning, the oxygen included in the product can also cause deterioration of the container's plastic or metal lining, packaging, etc. Thus, in modern beverage and food product preparation systems, it is desirable to remove the extraneous oxygen from the fluids to greatly increase the shelf life of the packaged product prior to and/or during on-line processing.

This is particularly important in modern brewing operations, wherein the feed stock must be almost completely deoxygenated in that the presence of even a small fraction of oxygen can result in an unacceptable product. As a result, in modern beverage and food product operations, various deoxygenating devices including vacuum systems, oxygen-purging apparatuses, etc. are used to extract the oxygen.

Along this line, vacuum deareators have been commercially available for some time and have been used to lower the oxygen level in liquid products. Similarly, beverages and food stuffs have also been subject to gas-flushing. However, vacuum deareators and gas flushing apparatuses are fairly expensive and they do not necessarily reduce the dissolve oxygen content to an acceptable level. Furthermore, these apparatuses have some drawbacks in that the oils and lubricants used therein sometimes find their way into the fluids being treated. The inclusion of even a small amount of such harmful agents within the beverage and/or food product can produce undesirable color and/or flavor changes in the overall product, as well as toxic effects.

In addition, in order to remove some of the oxygen which slips by the vacuum deareators and/or the gas-flushing apparatuses, it is sometimes desirable to add various chemical antioxidants to the beverage or food product. However, the consuming public is becoming much more concerned about the uses of chemicals and preservatives in foods and beverages including antioxidants, etc. Hence, it would be desirous to produce a process which removes oxygen from fluid streams without causing any harmful effects to the end product.

Moreover, the presence of oxygen in various industrial processes also produces a great deal of harm. In this regard, dissolved oxygen has been identified as a contributor in the corrosion of heating and cooling systems, such as boiler apparatuses and the primary and secondary coolant systems of nuclear power plants. It has been indicated that even low levels of dissolved oxygen (i.e. less than 20 parts of oxygen in one million parts of water) can contribute to the oxidation of the iron, copper, aluminum, brass, and other metallic components of these heating and cooling systems. The deoxygenation of water in fluids utilized in these systems is known to reduce corrosion and thereby extend equipment life, reduce pipeline and equipment costs, and lower overall maintenance.

Furthermore, it is also quite desirous to remove oxygen from various manufacturing processes. This is particularly true in a number of chemical processes, wherein the presence of oxygen can impede chemical reactions, as well as create undesirable side products. Similarly, in pharmaceutical processes, it is often quite beneficial to remove oxygenated compounds to avoid degradation, contamination, etc. Some of this technology is now being applied to new areas of research concerning biotechnology and semiconductor production where use of "ultra-pure" water is required.

Moreover, in various treatment processes, it is also advantageous to remove oxygen from the waste products in order to enhance anaerobic degradation. Anaerobic bacteria degradation systems are utilized in a wide variety of residential and industrial sewage treatment facilities. In addition, large manufacturers also utilize anaerobic bacteria degradation processes to break down various waste streams. In order to enhance the degradation of these waste products, it is important to maintain an overall anaerobic or deoxygenated state during the continuous on-line processing.

Accordingly, the present invention is directed to a continuous on-line apparatus and process for removing oxygen from various aqueous fluids in a safe and efficient manner without altering the desired properties of the products produced thereby. More particularly, the present invention is directed to the use of immobilized oxygen scavenging cell membrane fragments having an electron transport system which reduces oxygen to water. The membrane fragments contain a series of enzymes that work in cooperation with one another to convert the oxygen present in the fluids to water. By immobilizing the fragments, and in turn, immobilizing the effective enzyme system contained therein, it is possible to continuously remove oxygen from any process stream.

As a result, the present invention is substantially different from the previously known mechanical and chemical processes for removing oxygen from fluids. The only known reference which is similar to the present invention is the process disclosed in U.S. Pat. No. 4,414,334 for "Oxygen Scavenging With Enzymes", issued on Nov. 8, 1983 to Donald O. Hitzman of Bartlesville, Okla. In the '334 patent, the removal of ambient oxygen from aqueous liquids is catalyzed by alcohol oxidase in the presence of alcohol and optionally with catalase. While the process disclosed in the '334 patent has certain features in common with the present invention, i.e. the removal of oxygen enzymatically, the enzymes involved therein are distinctly different from the present invention in composition and effectiveness.

Specifically, the enzymes utilized in the process disclosed in the '334 patent are alcohol oxidase and catalase. These enzymes are extremely different from the enzymes contained in the membrane fragments of the present invention in structure, organization, and source. In this regard, the enzymes found in the cell membrane fragments of the present invention comprise a very intricate system, i.e. the electron transport system which reduces oxygen to water. These enzymes work in a cohesive relationship, and their location and arrangement in the membrane fragments is important to their proper and efficient function. Since the enzymes operate as a system within the membrane bound particles, the stability of the enzyme system is greatly enhanced.

In contrast, the enzymes in the '334 patent are individual proteins that are mixed together to give their desired reactions. These enzymes are not part of an integral system, but individual enzymes with only limited designation duty with no structural arrangement or association with one another.

Enzymes found in the cell membrane fragments of the present invention exist in all aerobic microorganisms, plants, and animals. However, the alcohol oxidase and catalase enzymes disclosed in the process of the '334 patent are often not found together in the same organism nor can they be isolated simultaneously. Furthermore, alcohol oxidase and catalase enzymes are not membrane bound.

Since the enzymes utilized in the '334 patent and the present invention differ greatly in composition and function, the methods for producing and/or isolating the enzymes are also very distinct. In this regard, one could not isolate the enzymes utilized in the present invention by the methods described in the '334 patent nor could one isolate the alcohol oxidase or the catalase utilized in the '334 patent by the methods described below.

Furthermore, the enzymes differ greatly in the substrates that they activate. The enzymes utilized in the present invention use a wide array of substrates as hydrogen donors, generally organic acids or their alkali salts. However, the enzymes utilized in the '334 process, i.e. alcohol oxidase and catalase react specifically with alcohols and hydrogen peroxide, respectively. Without the presence of either alcohol or hydrogen peroxide as the substrate, the enzymes utilized in the '334 patent would be inactive.

In addition, the enzymes of the present invention and the process disclosed in the '334 patent also differ in regard to the products produced. The enzymes utilized in the present invention often produce an organic acid and water as the end products, both of which are commonly found in biological materials, particularly food stuffs and thus, do not result in harmful additives. However, the alcohol oxidase utilized in the '334 patent produces an aldehyde and hydrogen peroxide as the end products. These end products are not widely found in nature and may not be desirable in food stuffs. Similarly, catalase utilized in the '334 patent reacts with hydrogen peroxide to produce oxygen and water. Thus, the '334 patent not only leads to the formation of undesirable products (aldehyde and hydrogen peroxide), it also results in the further production of oxygen, the product desired to be removed.

In summary, not only do the enzymes disclosed in the '334 patent differ from the enzymes utilized in the present invention in regard to composition and structure, the enzymes disclosed in the '334 patent are also inefficient in comparison to the enzymes of the present invention.

SUMMARY OF THE INVENTION

In one aspect, the present invention is directed to a continuous flow method for removing oxygen from a fluid stream. The method comprises the steps of providing a fluid stream containing oxygen, causing the fluid stream to come in contact with a sufficient amount of oxygen scavenging cell membrane fragments having an electron transfer system which is capable of reducing oxygen to water, to catalyze the transformation of the oxygen contained in the fluid stream to water, and then removing the deoxygenated fluid stream from the oxygen scavenging membrane fragments.

In another aspect, the present invention relates to a continuous flow method for removing oxygen from a fluid stream. The method comprises the steps of providing a fluid stream containing oxygen, causing the fluid stream to come in contact with the first side of a synthetic membrane having a first side capable of passing oxygen and preventing the passage of fluid, and a second side capable of transferring oxygen to an aqueous solution containing oxygen scavenging cell membrane fragments having an electron transport system which reduces oxygen to water, wherein the contact takes place in a container impermeable to oxygen except through the synthetic membrane, and, then removing the deoxygenated fluid stream from the container.

In still another aspect, the present invention is directed to an apparatus for removing oxygen from a fluid stream. The apparatus is comprised of a flow-through reactor chamber containing a sufficient amount of oxygen scavenging cell membrane fragments having an electron transport system which reduces oxygen to water to catalyze the transformation of oxygen and a substrate present in a fluid stream to an organic acid and water, wherein the fragments are contained therein in a manner which allows free contact between the fragments and the fluid stream flowing therethrough. A means for introducing a fluid stream containing oxygen into the flow-through reaction chamber and a means for removing the fluid stream containing the organic acid and water are also provided.

In still a further aspect, the present invention relates to an apparatus for removing oxygen from a fluid stream. The apparatus comprises a flow-through reactor chamber having a first compartment and a second compartment separated by a synthetic membrane capable of passing oxygen and preventing the passage of fluid, wherein the first compartment is impermeable to oxygen except by the synthetic membrane and possesses means for maintaining the fluid in contact with one side of the synthetic membrane and an inflow and outflow means for conducting the fluid into and out of the first compartment, and wherein the second compartment possesses a carrier fluid which is in contact with the second side of the synthetic membrane and oxygen scavenging cell membrane fragments having an electron transport system which reduces oxygen to water.

BRIEF DESCRIPTION OF THE DRAWINGS

A more complete appreciation of the invention and many of the attendant advantages thereof will be better understood by reference to the following detailed description when considered in connection with the accompanying drawings, wherein.

Figure 1:
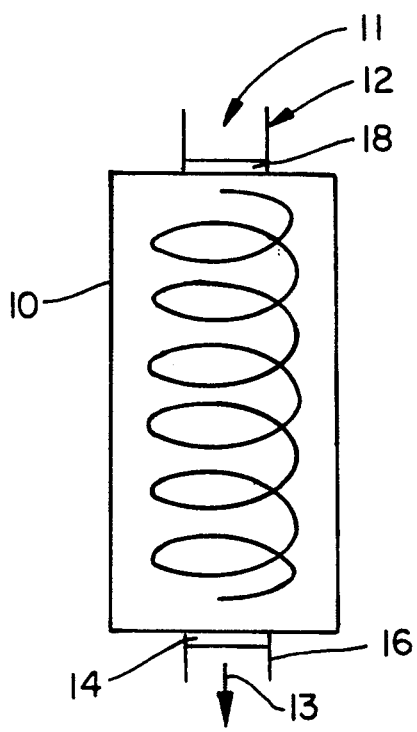
FIG. 1 is a schematic diagram of a flow-through reaction chamber of the present invention.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The present invention relates to a novel apparatus and process for removing oxygen from on-line processing streams. Specifically, the present invention is directed to the use of immobilized oxygen scavenging cell membrane fragments possessing an electron transport system which reduces oxygen to water for removing dissolved oxygen from fluid streams either prior to and/or during processing.

The oxygen scavenging cell membrane fragments utilized in the present invention, as well as the process for isolating and purifying same, are similar to the membrane fragments and filtration process disclosed in U.S. Pat. No. 4,476,224 for "Material and Method for Promoting the Growth of Anaerobic Bacteria", issued on Oct. 9, 1984 to Howard I. Adler, Oak Ridge, Tenn., one of the coinventors of the present invention. The '224 patent is incorporated herein by reference. In this regard, the '224 patent is directed to a method of removing dissolved oxygen from a nutrient medium for anaerobic bacteria through the use of sterile membrane fragments derived from bacteria having membranes which contain an electron transport system which reduces oxygen to water in the presence of a hydrogen donor in the nutrient medium. It is known that a great number of bacteria have cytoplasmic membranes which contain the electron transport system that effectively reduces oxygen to water if a suitable hydrogen donor is present in the medium. Some of the bacterial sources identified in the '224 patent include *Escherichia coli, Salmonella typhimurium, Gluconobacter oxydans,* and *Pseudomonas aeruginosa.* These bacterial membranes have been highly effective in removing oxygen from media and other aqueous and semi-solid environments.

The same oxygen reducing effect produced by the bacterial membrane fragments is also present in the membrane of mitochondrial organelles of a large number of higher non-bacterial organisms. More particularly, a great number of fungi, yeasts, and plants and animals have mitochondria that reduces oxygen to water, if a suitable hydrogen donor is present in the medium. Some of the sources of oxygen reducing membranes from these mitochondria are: beef heart muscle, potato tubers, spinach, *Saccharomyces, Neurospora, Aspergillus, Euglena* and *Chlamydomonas.* The process of producing the useful mitochondria membrane fragments involves the following steps:

1. Yeast, fungal cells, algae and protozoa, having mitochondrial membranes containing an electron transfer system which reduces oxygen to water, are grown under suitable conditions of active aeration and a temperature which is conducive to the growth of the cells, usually about 20° C. to 45° C. in a broth media. Alternately, mitochondria may be obtained from cells of animal or plant origin.
2. The cells are collected by centrifugation or filtration, and are washed with distilled water.
3. For the preparation of crude mitochondrial membrane fragments, a concentrated suspension of the cells is treated to break up the cell walls and mitochondria. This is accomplished by known means, for example, by ultrasonic treatment or by passing the suspension several times through a French pressure cell at 20,000 psi.
4. The cellular debris is removed by low speed centrifugation or by microfiltration (cross-flow filtration).
5. The supernatant or filtrate is subjected to high speed centrifugation (175,000 Xg at 5° C.) or ultrafiltration.
6. For the preparation of material of higher purity, the cells of step 2 are suspended in a buffer containing 1.0M sucrose and are treated by means which break up the cell walls or membranes but leave the mitochondria intact. This is accomplished by known means, for example, by ultrasonic treatment, passage through a French pressure cell at low pressure, enzymatic digestion or high speed blending with glass beads.
7. The cellular debris from step 6 is removed by differential centrifugation or filtration.
8. The supernatant or retentate from step 7 is passed through a French Press at 20,000 psi to break the mitochondria into small pieces.
9. Mitochondria debris from step 7 is removed by centrifugation at 12,000 Xg for approximately 15 minutes or by microfiltration.
10. The supernatant or filtrate from step 9 is subjected to high speed centrifugation (175,000 Xg at 5° C.) or ultrafiltration.
11. The pellet or retentate from step 5 (crude mitochondrial fragments) or the pellet or retentate from step 10 (purified mitochondrial membrane fragments) are resuspended in a buffer solution at a pH of about 7.0 to about 7.5. A preferred buffer solution is 0.02M solution of N-2-hydroxyethylpiperazine-N'-2-ethane sulfonic acid (HEPES).
12. The membrane fragments in the buffer solution are then passed under pressure through a filter having openings of about 0.2 microns.
13. The suspension is then stored at about −20° C. for later use or it may be freeze dried.

This process, as well as the media produced thereby, is the subject matter of a separately filed co-pending U.S. patent application Ser. No. 938,190, filed on Dec. 5, 1986 for "Material and Method for Promoting Growth of Anaerobic Bacteria".

Suspensions of sterile membrane fragments of mitochondria can also be used to remove oxygen from media and other aqueous and semi-solid environments, on a batch basis. In this regard, the catalytic enzyme system present in the suspended membrane fragments can, in the presence of suitable hydrogen donors, reduce oxygen to water, thereby deoxygenating the environment. Thus, the bacterial and mitochondrial membrane fragments can be utilized in suspension form on a batch basis for many purposes which require the removal of oxygen from the contained environment.

For example, suspensions of the membrane fragments can be used on a batch basis to isolate or cultivate anaerobic microorganisms. In use, a small amount of the sterile membrane fragment suspension of either bacterial or mitochondrial membranes is added to a liquid medium which is to be used for the growth of the anaerobic bacteria (about 25 to 3000 mg of fragments per liter of medium). The medium is permitted to stand for a short period of time at a temperature of from about 5° C. to about 60° C. until the oxygen is consumed. This action takes up to about 20 to 30 minutes, depending upon the concentration of the sterile membrane fragments and the temperature. At concentrations of about 500 mg/l and temperatures of about 35° C., removal is effected in about 2-8 minutes. After the oxygen is removed, an inoculum of anaerobic bacteria is introduced into the medium. The inoculated medium is then incubated for the growth period at the proper temperature for the bacteria which are to be grown. Preferably, the air space above the liquid medium in its container is kept to a minimum or is flooded with an inert gas such as nitrogen. This reduces the amount of oxygen that must be removed by the membrane system and prolongs the life of the oxygen-consuming system. This also gives assurance that, if there is an accidental leak of air into the system, the system will consume the oxygen in that air and insure that the growth of the anaerobic bacteria will not be retarded.

In the case of the solid medium, such as agar, the membrane preparation is preferably added to the medium in a molten state at approximately 45° C. at a level of about 25 to 3000 mg of fragments per liter of medium. The medium is inoculated with the anaerobe to be grown and poured into Petri dishes, or the like and allowed to solidify. Finally, an overlay of molten agar is poured over the inoculated medium and allowed to solidify. This overlay serves as a barrier to the oxygen in air and slows the diffusion of oxygen to the inoculated layer. The Petri dishes are then incubated at the proper temperature for growth. Again, the Petri dishes should preferably be maintained in an atmosphere of inert gas, such as nitrogen, but good results can be obtained on rapidly growing anaerobes without such a precaution since the membrane system is capable of consuming oxygen from air which gets into the dish.

In the event that a synthetic media is employed, it may be necessary to add a small amount of hydrogen donor which does not interfere with the growth of the selected anaerobic bacteria. Suitable hydrogen donors are lactic acid, succinic acid, alpha-glycerol phosphate, formic acid, malic acid and, where available, their corresponding salts. Most natural media do not require the addition of a hydrogen donor, but with some media, particularly synthetic media, the addition of the hydrogen donor is necessary for the membrane fragments to perform their oxygen removing function.

Moreover, suspensions of the bacterial and mitochondrial membrane fragments have also been utilized on a batch basis to produce anaerobic conditions required in many industrial fermentation processes. Similarly, suspension of the bacterial and mitochondrial membrane fragments may also be used for preserving many oxygen sensitive organic substances. The use of the suspended membrane fragments in this regard, as well as by the other batch uses, produce little or no toxic side effects when used in amounts much greater than those required to achieve oxygen-free conditions.

However, notwithstanding the above, use of bacterial and mitochondrial membrane fragments suspended in the reactant solution is very impractical for some processes. This is particularly true in batch and continuous processing situations, wherein the suspension of bacterial and mitochondrial membrane fragments can be utilized to treat only a limited amount of material. In batch reactors, the membrane fragments are mixed with the reactant solution until the solution is deoxygenated. Then the tank must be cleaned for the next batch. In continuous operations, a continuously stirred tank reactor may be utilized wherein the initial reactant solution and membrane fragments are mixed and then pumped into a holding tank or pipe of sufficient length to allow deoxygenation to occur. After the desired reaction has been completed, the suspended membrane fragments are either removed and discarded in the process of preparing a product or they remain with the product wherein the enzymes contained therein are in an inactivated form. Thus, as a result of the suspended state of the membrane fragments, only a limited amount of the total potential enzymatic activity is utilized.

In order to increase the efficiency of the bacterial and mitochondria membrane fragments, the present invention is directed to a process and an apparatus for immobilizing the membrane fragments. By immobilizing the membrane fragments, and thus immobilizing the enzymes involved in an electronic transport system for reducing oxygen to water, the maximum amount of potential enzymatic activity can be utilized. In this regard, not only can the enzymes involved in the electron transport system be constantly reused until their activity is spent, it is also possible to concentrate the enzymes to a much greater level than that which could have been achieved in suspension form. The effect of this is to increase the efficiency of the reaction. This is particularly important when the reactants are found in low concentrations as is often the case with dissolved oxygen. As a unit of reactant volume moves through a column of immobilized membrane fragments, the enzymes contained therein may then be constantly exposed to the reactant volume, thereby producing repeated opportunities to bring about the desired reaction.

Furthermore, since the enzymes contained in the bacterial and mitochondrial membrane fragments require the presence of a hydrogen donating compound in order to reduce the oxygen dissolved in the reactant volume to water, and not all reactant volumes contain such hydrogen donating compounds, a further object of the present invention is to immobilize the membrane fragments in the presence of a hydrogen donating compound. Suitable hydrogen donating compounds for certain membrane fragments include lactic acid, succinic acid, alpha-glycerol phosphate, malic acid, or formic acid and, where available, their corresponding salts. The preferred substrate(s) depend on the source of the membrane fragments. By entrapping or incorporating the bacterial or mitochondrial fragments with a hydrogen donating substrate, the enzymes contained in the membrane fragments can be readily activated upon the presence of oxygen, thus producing a highly effective reduction process.

During the past several years, a number of immobilization processes have been developed for soluble enzymes. The main methods of enzyme immobilization are: (a) binding to a solid carrier or support. Supports are used for covalent binding including e.g. cellulose, ceramic, glass, steel, and synthetic polymers; usually, the support is "activated" and the enzyme is then allowed to bind (commonly via its amino or carboxyl groups) to the activated support. The active site of the enzyme can be protected by allowing binding to occur in the presence of the enzyme's substrate. Supports used for ionic binding include ion exchangers such as DEAE-cellulose. (b) Cross-linking with bifunctional reagents to form insoluble aggregates. Reagents used include glutaraldehyde (which binds enzymes via their amino groups), or diamines (e.g. hexamethylenediamine) which bind enzymes via their carboxyl groups after these groups have been "activated" with carbodiimides. (c) Encapsulation. Enzymes are enclosed within liposomes or hollow fibers which are permeable to low MWt substrates and products. (d) Entrapment within polymeric gels such as calcium alginate, K-carrageenan and polyacrylamide. Enzymes are added to a solution of the polymer which is then gelled e.g. by the addition of a gelling agent. Leakage of enzymes from the gel may be counteracted by cross-linking them, e.g. with glutaraldehyde. Entrapment is suitable primarily for bioconversion of low-MWt substrates which can diffuse through the gel.

However, although a number of immobilization processes are known, the physical and chemical properties of the enzyme often change during immobilization due to changes in the structure of the enzyme molecule. Similarly, changes in the microenvironment, such as changes in pH, temperature, ionic strength, etc. may effect the stability of the enzyme. Thus, the particular properties of an immobilized enzyme depend greatly upon the method of immobilization and the support material used.

An additional object of the present invention is to eliminate the disadvantage of known immobilization methods of soluble enzymes and to provide a process for the preparation of immobilized bacterial and mitochondrial membrane fragments containing enzymes which reduce oxygen to water in the presence of a hydrogen donor. The immobilized membrane fragments of the present invention are stable over a wide range of changes in pH and temperature and are suitable for prolonged application thereby ensuring large flow velocity and maximum activity.

Moreover, a further additional object of the present invention is to provide a method and apparatus for removing oxygen from a continuous process stream. In this regard, the reactant solution is introduced into a flow-through reaction chamber containing an amount of immobilized bacterial and/or mitochondrial membrane fragments possessing enzymes which reduce oxygen to water in the presence of a hydrogen donor, where the desired deoxygenation reaction takes place. The solution which is then substantially deoxygenated then continues to flow in the closed system for further processing.

The flow-through deoxygenation system of the present invention may operate by gravity and/or be supplemented through the use of some type of pumping means. In addition, the flow rate may also be controlled by the size and length of the reactor chambers and the connective piping so that the reactant solution is completely deoxygenated upon processing.

The reactor chamber may be any type of closed apparatus which allows for the flow-through of a continuous process stream without allowing for the removal of the immobilized membrane fragments. The immobilized membrane fragments must be contained in the closed apparatus in a manner which allows for free contact between the membrane fragments and the fluid stream flowing through the reactor.

An example of such a reactor chamber is a packed-bed reactor wherein the immobilized membrane fragments are packed in a cylinder through which the reactant fluid flows on a continuous basis. An illustration of such an apparatus is shown in FIG. 1. In this regard, the oxygenated reactant solution is supplied by gravity, and/or by a conventional method such as pumping, to reactor column 10 by means of an inflow pipe 12 and plug 18. Plug 18 allows for the inflow or outflow of fluid without any loss of particulate solids. The reaction column 10 contains an amount of bacterial and/or mitochondrial membrane fragments having enzymes which reduce oxygen to water in the presence of a hydrogen donor immobilized in a polyacrylamide gel (BioRad Laboratories, Richmond, Calif., BioGel P-6, Catalog No. 150-0730). A plug 14 closes the bottom of the column while allowing free flow of the reactant solution therethrough, thereby preventing any loss of the gel containing the membrane fragments from the column. The deoxygenated reactant solution 13 flows from the bottom of the column 10 by means of an oxygen impermeable outlet pipe 16 for further processing.

The reaction column for containing the immobilized membrane fragments may be a conventional glass tubing column, stainless steel, or one of compatible plastic. The reaction column may also be adjusted to deoxygenate the reactant fluid through either a down-flow or up-flow process. The gel utilized in the column may be polyacrylamide gel. Furthermore, a hydrogen donor source may be added to the gel if such a source is not present in the reactant solution, although many food products and beverages contain such hydrogen donors.

In operation, the oxygenated reactant solution flows by pumping means or gravity through the immobilized membrane fragment column in which the enzymes contained therein catalyzed the reduction of oxygen to water as the reactant solution flows through the column. The deoxygenation rate of the column may be adjusted by altering the flow rate of the reactant solution and/or by the amount of activity of the enzymes immobilized in the column. Moreover, the temperature and pH of the reactant solution may also be adjusted to optimize the deoxygenation process. Along this line, it has been determined that the enzymes present in the membrane fragments operate over wide pH and temperature ranges dependent upon the type of substrate present (i.e. from a pH of about 3 to a pH of about 9, and for a temperature of about 5° C. to a temperature of about 60° C.). With lactic acid as a substrate, the pH optimum is about 8.4. However, with formic acid as a substrate the pH optimum is below 7.0. By choosing the substrates, it is possible to select the operating pH level that would be suitable for a particular application. Moreover, the temperature range for activity is also wide, from a low of 5° C. to a high of about 60° C. Operating under optimal conditions, the present invention can lower dissolved oxygen to approximately 0.1 ppm. The membrane fragments are equivalent in oxygen reducing ability to a strong, chemical reducing agent, such as sodium hydrosulfite.

As more clearly demonstrated in Example 1 set forth below, the flow-through deoxygenation system and process of the present invention is highly effective in removing oxygen from a continuous process system.

EXAMPLE 1

One unit of a suspension of bacterial membrane fragments having an electron transport system which reduces oxygen to water in the presence of a hydrogen donor, wherein one unit is the amount of membrane fragments that reduce 1.0% of the dissolved oxygen per second per milliliter of a solution containing a 1.75 ml of a 10 mM sodium lactate solution in 20 mM phosphate buffer at pH 8.4 and a temperature of 37° C. was mixed with 10 ml of polyacrylamide gel and extruded through a syringe having an opening of approximately 0.3 mm. The membrane fragments were either isolated and purified by the process set forth above and/or in the '224 patent or the membrane fragments were commercially purchased from Oxyrase, Inc., Ashland, Ohio. The extruded polyacrylamide gel containing the membrane fragments was loaded into 1.6 cm diameter×40 cm water jacketed column manufactured by Pharmacia (LKB Biotechnology Co., Piscataway, N.J., Catalog No. C16/40), having a total volume of 80 ml. An oxygen sensor, i.e. Oxygraph, Gilson Model 5/6H, manufactured by Gilson Medical Electronics, Middletown, Wis., having an oxygen sensitivity of 0.1 ppm, was placed at the top of the column. Flow through the column was upflow with a single pass. Tris buffer at 10 mM and pH 7.8 was passed through the column. The temperature of the column was maintained at 37° C.

Figure 2:
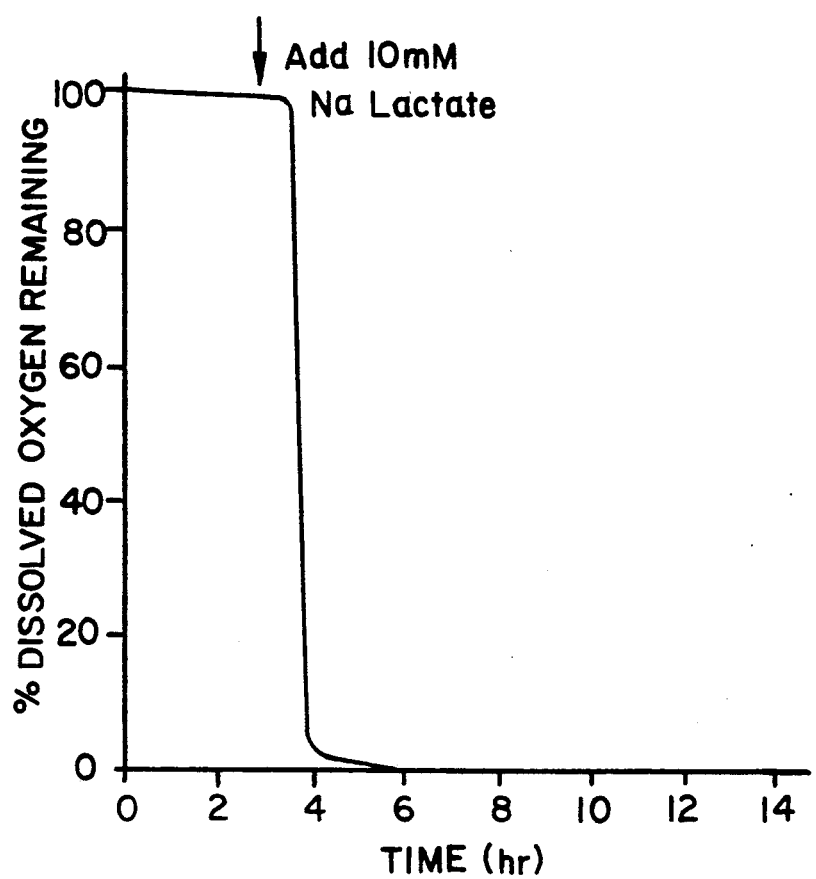
FIG. 2 is a graph illustrating the amount of dissolved oxygen remaining in a fluid stream processed with the immobilized membrane fragments of the present invention over a period of time (hours)
Figure 3:
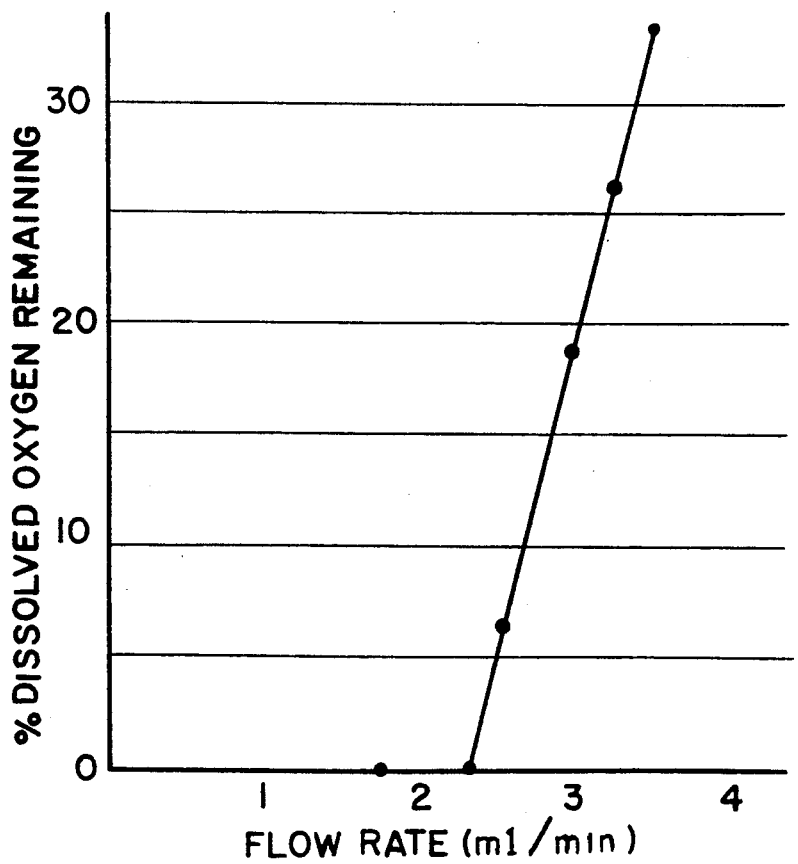
FIG. 3 is a graph illustrating the amount of dissolved oxygen remaining in a fluid stream processed with the immobilized membrane fragments of the present invention at various flow rates (ml/min)

During the first run, the percentage of oxygen present in the Tris buffer solution passing through the column at a flow rate of 1.8 ml/min. was determined. See FIG. 2. The residence time in the reactor at the flow rate of 1.8 ml/min. was approximately 44.4 minutes. After approximately 3 hours, 10 mM of a substrate, i.e. sodium lactate, was added to the reservoir of Tris buffer. The test data clearly indicates that the dissolved oxygen was not removed until a substrate for the enzymes present in the membrane fragments was added. The lag from the time of substrate addition to the complete removal of dissolved oxygen was due to the flow rate and the volume of the reactor which produced a residence time of about 44.4 minutes. The column was then subsequently operated at a flow rate of 1.8 ml/min. for a period of 15 days without any detectable decline in the efficiency of dissolved oxygen removal (i.e. almost 100% oxygen removal).

A second run was conducted under the same conditions set forth above (i.e. with the inclusion of the substrate) except that the flow rate was varied while the removal of dissolved oxygen was monitored. See FIG. 2. The test data indicates that when the flow rate was below 2.4 ml/min. all of the dissolved oxygen was removed from the effluent.

The above results indicate that the flow-through deoxygenation system of the present invention is capable of continuous operation to remove dissolved oxygen from a process stream.

Moreover, notwithstanding the above, additional embodiments of the flow-through deoxygenation reactor of the present invention are also available. What follows is a description of some of the more preferred embodiments of the invention wherein the membrane fragments are restricted and/or immobilized from the process stream by a oxygen permeable membrane. Although reference is made herein to the oxygen permeable membrane as a "synthetic membrane" for purposes of distinguishing the "membrane fragments" containing the enzyme system from the "oxygen permeable membrane" utilized to separate and/or immobilize the membrane fragments, no limitations as to the type and/or the nature of the materials used to manufacture the membrane are made hereby. In this regard, the membrane utilized in the present invention to separate and/or immobilize the membrane fragments may be of natural and/or artificial origin.

Figure 4A:
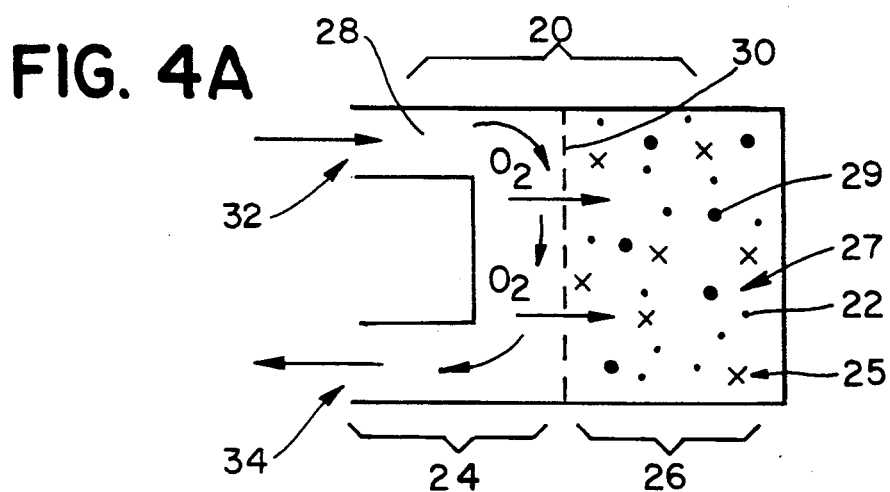
FIGS. 4A and 4B are schematic diagrams illustrating the two compartment reactors of the present invention; and, FIGS. 5A, 5B, and 5C are schematic diagrams of the tubular synthetic membrane embodiments of the present invention.

More particularly, FIG. 4A shows an embodiment of the present invention comprising a two compartment reactor 20 wherein the first compartment 24 is separated from a second compartment 26 by a synthetic membrane 30 which has the ability to pass oxygen while preventing the passage of other components of the fluid stream 28 from which the oxygen is extracted. The first compartment 24 directs the passage of fluid stream 28 by an inflow means 32 and an outflow means 34 by which fluid containing oxygen to be removed and fluid from which oxygen has been removed, is respectively introduced and removed from the first compartment 24. The second compartment 26 contains membrane fragments 22 and substrate 25 in carrier solution 27 which are separated and immobilized from the first compartment 24 by synthetic membrane 30. The membrane fragments 22 may also be attached to the wall of the second compartment 26 or carrier particles 29 present in the second compartment 26. However, it is not necessary that said carrier particles 29 always be present. It is also possible to attach the membrane fragments 22 directly to the synthetic membrane 30.

The invention is carried out by flowing fluid containing oxygen, i.e. fluid stream 28, through inflow means 32 into first compartment 24 where the oxygen present therein passes across the oxygen permeable synthetic membrane 30 into the carrier solution 27 of the second compartment 26 wherein the enzymes present in the immobilized membrane fragments 22 catalyze the reduction of oxygen to water. As a result of the impermeability of the membrane to any other components of the fluid stream, the deoxygenated fluid stream is then emitted by outflow means 34 for further processing. While FIG. 4A shows the clockwise flow of fluid 28 past membrane 30, it is also possible to carry out the present invention using a counter-clockwise flow, or an alternately clockwise-counterclockwise flow.

Figure 4B:
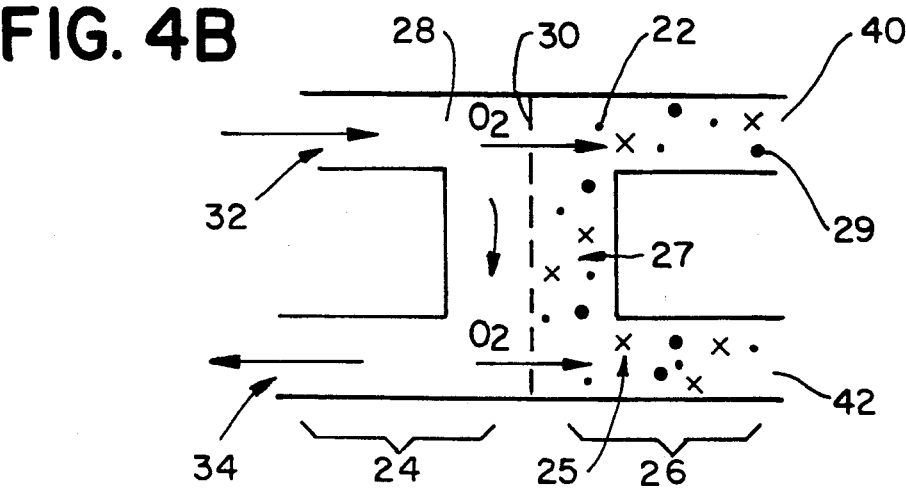

FIG. 4B shows an alternative embodiment of the two compartment reactor 20 of FIG. 4A wherein the second compartment 26 has been modified to contain an inlet 40 and an outlet 42. Such a modification allows for the carrier solution 27 containing membrane fragments 22 and/or the substrate 25 to be circulated in the second compartment 26 by conventional means such as by a pump (not shown). Although FIG. 4B indicates concurrent flow of the fluids past synthetic membrane 30, it is also possible to carry out the invention using counter-current flow or a combination of concurrent and countercurrent flow so long as there is the continued contact of fluid with membrane 30.

The overall shape and size of the apparatuses disclosed in FIGS. 4A and 4B are not important except that an inflow and outflow means are required in the first compartment in order to process the fluid stream past the oxygen permeable barrier (synthetic membrane) which separates the first compartment from the second compartment. The rate of flow and the diameter and surface area of the synthetic membrane can be experimentally adjusted to determine the most effective parameters for the size and shape of the apparatus utilized. However, since the present invention is directed to the removal of oxygen from a process stream, all of the hardware, with the exception of the synthetic membrane, should be non-permeable to air or oxygen.

The type of synthetic membrane utilized in the two compartment embodiment of the present invention is not limited except for the synthetic membranes ability to pass oxygen while preventing the passage of other components of the process stream from which the oxygen is being extracted. Although the most important synthetic membranes are formed from organic polymers (i.e. polyethylene, polyproplyene, polyamides, polimides, polysulfones, polycarbonates, polyacrylonitriles, polyvinyl alcohol, polyurethanes, etc.), natural polymers, such as cellulose, etc. can be used so long as the synthetic membrane is permeable to oxygen without being sensitive to passage of other compounds of the process stream.

Moreover, in addition to oxygen permeability, inertness of the synthetic membrane to the material contained in the process stream and to the internal carrier fluid is also required. In this regard, the present invention offers many advantages over deoxygenating apparatuses and processes which utilize synthetic membrane systems and harmful and caustic chemical reducing agents. Since the carrier and membrane fragments of the present invention are natural products, the synthetic membranes utilized therein are not limited to those which are compatible with some type of caustic chemical deoxygenating agent.

The carrier fluid can be any solution in which oxygen can be readily transferred. Various agents such as dispersion agents, etc. may also be included in the carrier fluid when necessary to enhance dispersion of the membrane fragments thereby increasing enzymatic activity.

In addition, the physical microstructure of the synthetic membrane is not significant so long as the synthetic membrane performs the functions described above. Hence, dense films, porous synthetic membranes, and asymmetric and composite synthetic membranes can be utilized.

Furthermore, the macroscopic form of the synthetic membrane is also not particularly important. Synthetic membranes in the form of flat sheets, tubes of relatively large diameter, or fine hollow fibers may be used. In this regard, hollow fibers offer two primary advantages over flat sheet or tubular synthetic membranes. First, hollow fibers exhibit higher productivity per unit volume; second, they are self-supporting. Moreover, the fibers or tubes can be employed singly or grouped into a bundle which may contain hundreds of fibers. The primary disadvantages of the hollow fiber unit as compared with the other synthetic membrane configurations is its vulnerability to fouling and plugging by particulate matter.

Further advantages for using a synthetic membrane as an oxygen permeable barrier between the process fluid stream and the carrier fluid containing the membrane fragments are that the substrates, membrane fragments and reactants are contained in the carrier fluid and do not mix with the process fluid stream. This eliminates the need to purify the process fluid stream of these components. In addition, the oxygen permeable synthetic membrane barrier also makes possible the deoxygenation of process fluid streams that are incompatible with the carrier fluid, for example, oils and fluid fats. Still another advantage is that physical and chemical conditions of the process fluid stream can be optimized independently of the carrier fluid and vice versa.

Figure 5A:
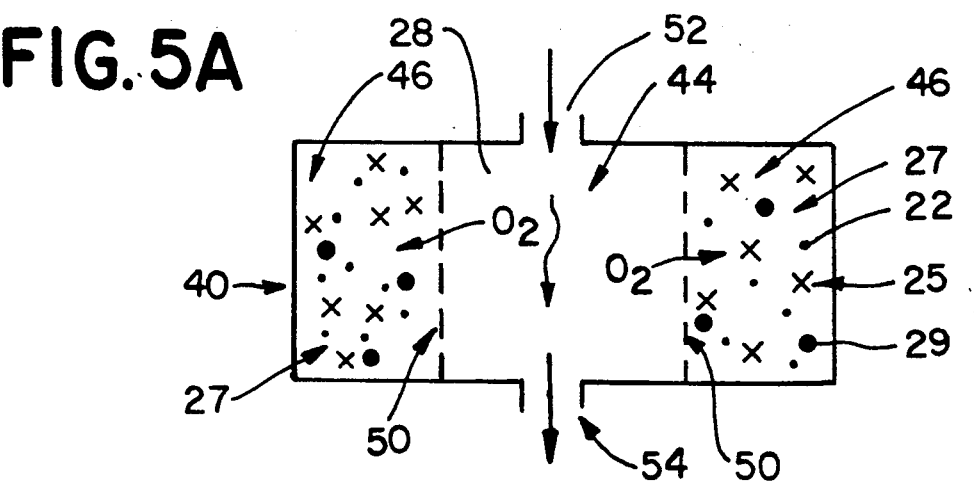
Figure 5B:
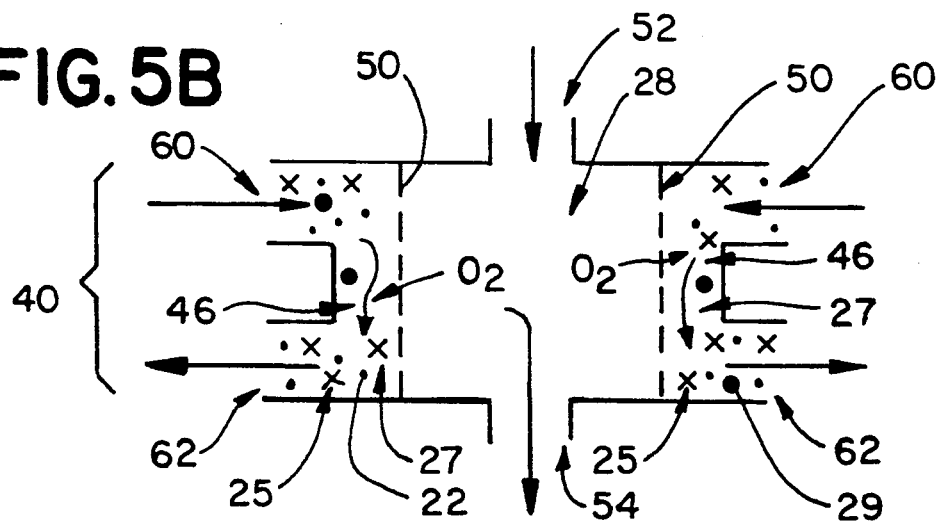
Figure 5C:
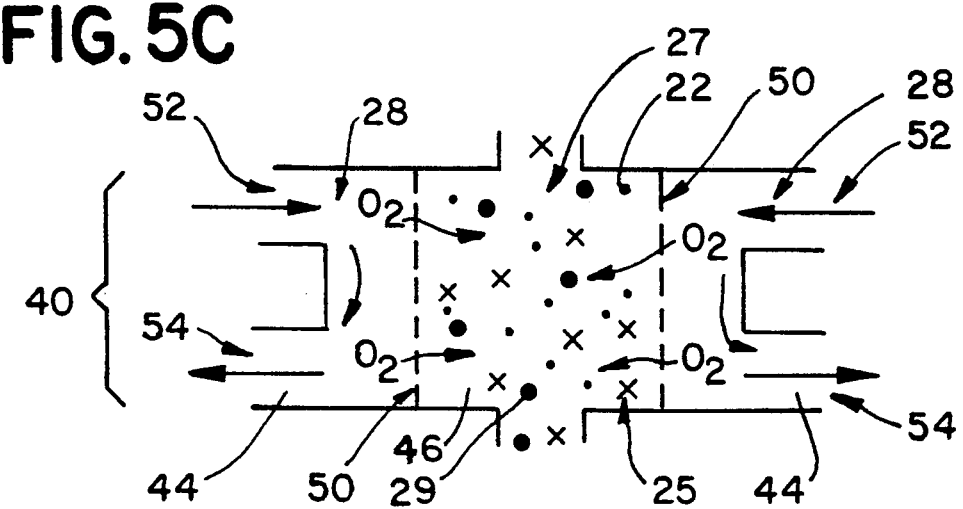

FIGS. 5A-5C demonstrate a number of alternative embodiments of the present invention when a tube or hollow fiber is utilized as the synthetic membrane. In this regard, the carrier solution 27 containing the oxygen scavenging membrane fragments 22 and substrate 25 may be present either inside or outside the synthetic membrane tube with the fluid stream 28 from which the oxygen is extracted present either outside or inside the synthetic membrane tube, respectively. More particularly, FIG. 5A shows an embodiment of the present invention comprising a two compartment reactor 40 wherein the first compartment 44 is separated from the second compartment 46 by a tubular or hollow fiber synthetic membrane 50 which has the ability to pass oxygen while preventing the passage of other components of the fluid stream 28 from which the oxygen is extracted. The first compartment 44 directs the passage of fluid stream 28 by an inflow means 52 and an outflow means 54 by which fluid containing oxygen to be removed and fluid from which oxygen has been removed are respectively introduced and removed from the first compartment 44. The second compartment 46 contains membrane fragments 22 and substrate 25 in carrier solution 27 which are separated and immobilized from the first compartment by synthetic membrane 50.

The membrane fragments 22 may also be attached to the wall of the second compartment 46 or carrier particles 29 present in the second compartment 46. It is also possible to attach the membrane fragments 22 directly to the synthetic membrane 50. The invention is carried out by flowing fluid containing oxygen through inflow means 52 into first compartment 44 where the oxygen present therein passes across the oxygen permeable tubular synthetic membrane 50 into the carrier solution 27 of the second compartment 46 wherein the enzymes present in the immobilized membrane fragments 22 catalyze the reduction of oxygen to water.

FIG. 5B shows an alternative embodiment of the two compartment tubular reactor 40 of FIG. 5A wherein the second compartment 46 has been modified to contain an inlet 60 and an outlet 62. Such a modification allows for the carrier solution 27 containing membrane fragments 22 and/or the substrate 25 and carrier particles 29 to be circulated in the second compartment 46 by conventional means such as by a pump (not shown). Although FIG. 5B indicates concurrent flow of the fluids past synthetic membrane 50, it is also possible to carry out the invention using countercurrent or tangential flow or a combination of concurrent and countercurrent flow so long as there is the continued contact of fluid with synthetic membrane 50.

FIG. 5C shows an embodiment of the two compartment tubular reactor 40 wherein said second compartment 46 containing said carrier solution 27, membrane fragments 22 and substrate 25 of FIG. 5B is present in the interior of tubular synthetic membrane 50. In this embodiment of the invention, oxygen present in the fluid stream 28 of the first compartment 44 diffuses into the carrier solution 27 contained inside the tubular synthetic membrane 50. Accordingly, the present invention can be readily adopted for a wide variety of tubular synthetic membrane usage.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims and the equivalent thereof.

Having thus described the preferred embodiment, the invention is now claimed to be:

1. A continuous flow method for removing oxygen from a fluid stream comprising the steps of:
   a) causing a fluid stream containing oxygen and a hydrogen donating substance selected from the group consisting of lactic acid, succinic acid, alpha-glycerol phosphate, formic acid and malic acid to come in contact with a sufficient amount of oxygen scavenging membrane fragments to cause a lowering of the oxygen concentration of the fluid stream, wherein said membrane fragments have an electron transport system which catalyzes the reduction of the oxygen contained in the fluid stream to water, wherein said fragments are immobilized in a manner which allows for free contact between the oxygen contained in the fluid stream and said fragments and wherein said fragments are derived from the cytoplasmic membranes of bacteria selected from the group consisting of *Escherichia, Bacillus, Salmonella, Gluconobacter* and *Pseudomonas;* and
   b) removing the deoxygenated fluid stream from the immobilized fragments.

2. The method of claim 1 wherein the velocity of the fluid stream in contact with the immobilized fragments is controlled in order to regulate the amount of oxygen removed from the stream.

3. The method of claim 1, wherein the fluid stream containing oxygen is at a temperature from about 5° C. to about 60° C.

4. The method of claim 1, wherein the fluid stream containing oxygen is at a pH from about 3 to about 9.

5. A continuous flow method for removing oxygen from a fluid stream comprising the steps of:
   a) causing a fluid stream containing oxygen to come in contact with the first side of a synthetic membrane having a first side capable of passing oxygen and preventing the passage of said fluid, and a second side capable of transferring oxygen to a carrier solution containing a hydrogen donating substance selected from the group consisting of lactic acid, succinic acid, alpha-glycerol phosphate, formic acid and malic acid, and oxygen scavenging cell membrane fragments having an electron transport system which catalyzes the reduction of oxygen contained in the fluid stream to water wherein such reduction takes place in a container impermeable to oxygen except through said synthetic membrane, and wherein said fragments are derived from the cytoplasmic membranes of bacteria selected from the group consisting of *Escherichia, Bacillus, Salmonella, Gluconobacter* and *Pseudomonas;* and
   b) removing the deoxygenated fluid stream.

6. The method of claim 5 wherein the velocity of the fluid stream in contact with the immobilized fragments is controlled in order to regulate the amount of oxygen removed from the stream.

7. The method of claim 5, wherein the carrier solution is at a temperature from about 5° C. to about 60° C.

8. The method of claim 5, wherein the carrier solution is at a pH from about 3 to about 9.

* * * * *